3,398,197
N-SECONDARY-ALKYL TERTIARY AMINE COMPOUNDS

Eugene J. Miller, Jr., Wheaton, and Ago Mais, La Grange Park, Ill., assignors, by mesne assignments, to Armour Industrial Chemical Company, a corporation of Delaware
No Drawing. Filed Feb. 23, 1965, Ser. No. 434,607
12 Claims. (Cl. 260—584)

ABSTRACT OF THE DISCLOSURE

Alkylated and alkoxylated tertiary amine compounds wherein one tertiary nitrogen atom has a secondary-alkyl group attached to it, useful as fuel additives, bactericides.

---

The N-secondary-alkyl tertiary amine compounds of this invention have special utility as fuel oil additives, synthetic lubricant additives, bactericides, ore flotation agents, catalysts in preparing polymer foams, and are excellent intermediates for further chemical reactions such as, for example, the formation of amine oxides and quaternary ammonium compounds.

Accordingly, an object of this invention is to provide novel tertiary amine compounds which are useful in various chemical technologies.

More specifically, an object of this invention is to provide a novel class of N-secondary-alkyl tertiary amine compounds having surprisingly valuable physical and chemical properties for many chemical technologies.

Another object of this invention is to provide a novel class of N-secondary-alkyl methylated tertiary amine compounds.

Still another object of this invention is to provide a novel class of N-secondary-alkyl ethoxylated tertiary amine compounds.

A further object of this invention is to provide a novel class of N-secondary-alkyl propoxylated tertiary amine compounds.

The novel tertiary amine compounds of this invention may be described by the formula:

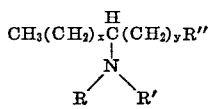

wherein R is selected from the group consisting of —CH$_3$, —(CH$_2$CH$_2$O)$_m$H, and

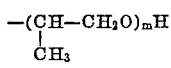

wherein $m$ is an integer and the sum of the values of $m$ for the entire molecule being from 2 to 80; R' is selected from the group consisting of R and

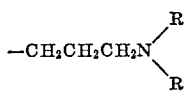

wherein R is the same as defined above; R" is selected from the group consisting of —H and

wherein R and R' are the same as defined above; and $x$ and $y$ are positive integers having a sum from 2 to about 47.

It has now been found that a new and useful class of N-secondary-alkyl tertiary amine compounds may be prepared by alkylating or alkoxylating secondary-alkyl primary amines, amino substituted secondary-alkyl primary amines, and N-secondary-alkyl diamine compounds. Processes of alkylation and alkoxylation well known in the art are suitable for these reactions. The primary amine compounds suitable as reactants to produce the novel compounds of this invention are described in the co-pending U.S. patent application, Ser. No. 397,287, filed Sept. 17, 1964. Diamine compounds suitable as reactants to produce the novel compounds of this invention are disclosed in co-pending U.S. patent application, Ser. No. 422,504, filed Dec. 31, 1964. Indeed, any of the secondary-alkyl amine compounds disclosed in these co-pending applications may be used as the amine reactant in the production of the novel tertiary amine compounds of this invention.

The novel tertiary amine compounds of this invention, as illustrated by the above formula, reflect the isomeric nature of the amine reactants used for their preparation. The amine reactants used to prepare the tertiary amine compounds of this invention may be derived from olefinic compounds, in which case the nitrogen atom attached to the secondary-alkyl group may be attached to different interior carbon atoms along a hydrocarbon chain. Isomeric mixtures of various secondary-alkyl amines may be used to form the novel N-secondary-alkyl tertiary amine compounds of this invention. Of particular importance as reactants in the preparation of compounds of this invention are secondary-alkyl amine compounds derived from alpha-olefins. Further, the secondary-alkyl amine reactants used to form the novel tertiary amine compounds of this invention may consist of a mixture of different hydrocarbon chain lengths, usually extending over a range from 2 to about 6 numerically consecutive chain lengths. The mixture of chain lengths is generally dependent upon the cut of mixed olefins from which the secondary-alkyl amines were derived, and is not critical in the formation of the compounds of this invention.

In a specific embodiment, a preferred subclass of tertiary amine compounds of this invention is prepared by methylating secondary-alkyl primary amines and N-secondary-alkyl diamines resulting in novel tertiary amine compounds having the formulae:

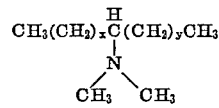

and

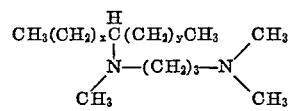

wherein $x$ and $y$ are integers having a sum from 1 to about 20; and

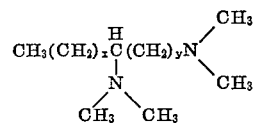

wherein $x$ and $y$ are positive integers having a sum from 2 to about 20. Methylated tertiary amine compounds having the above structures may be produced according to processes well known in the art. For example, the process disclosed in U.S. Patent 3,136,819 may be followed using the reactants described above.

In another specific embodiment, a preferred subclass of tertiary amine compounds of this invention is prepared by adding ethylene oxide to the amino groups of secondary-alkyl primary amines and N-secondary-alkyl diamines resulting in novel tertiary amine compounds represented by the formulae:

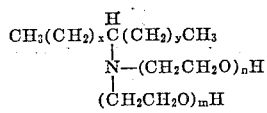

and

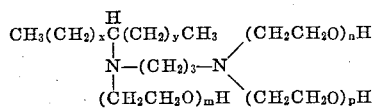

wherein $x$ and $y$ are integers having a sum from 1 to about 20; and

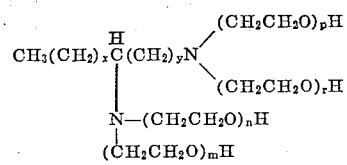

wherein $x$ and $y$ are positive integers having a sum from 2 to about 20; and $m$, $n$, $p$, and $r$ are integers, having a sum from 2 to about 50 in each molecule of the above three formulae.

Another preferred subclass of tertiary amine compounds of this invention is prepared by adding propylene oxide to the amino groups of secondary-alkyl primary amines and N-secondary-alkyl diamines resulting in novel tertiary amine compounds represented by the formulae immediately above wherein the

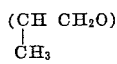

group is substituted for each $(CH_2CH_2O)$ group appearing in the formulae shown.

Alkoxylated tertiary amine compounds, and particularly ethylene oxide and propylene oxide amine adducts, having the above structures may be produced according to processes well known in the art. For example, the process shown in U.S. Patent 2,759,021 may be followed using the reactants described above.

Among radicals comprising secondary-alkyl groups in the above formulae of three specific embodiments are sec-butyl, sec-pentyl, sec-hexyl, sec-heptyl, sec-octyl, sec-nonyl, sec-decyl, sec-undecyl, sec-dodecyl, sec-tridecyl, sec-tetradecyl, sec-pentadecyl, sec-hexadecyl, sec-heptadecyl, sec-octadecyl, sec-nonadecyl, sec-eicosyl, sec-heneiconsyl, sec-docosyl, and their terminally substitued nitrogen derivatives.

Specific embodiments of this invention may be illustrated by reference to the following examples:

EXAMPLE I

A five liter Morton flask equipped with a mechanical stirrer, thermometer, addition funnel, and reflux condenser was charged with 676.6 gms. (3.33 moles) $C_{11}$–$C_{15}$ sec-alkyl primary amine, 338 gms. isopropanol and 338 gms. of water. Ten moles (522.8 gms.) formic acid (88% aqueous solution) was then added to the reaction flask over a 5-hour period, maintaining the temperature at 25 to 35° C. The temperature was raised to 65 to 70° C. and 542.8 gms. (6.66 moles) of 37% formaldehyde was added over a period of one hour. The reaction mixture was maintained at reflux temperature (89° C.) for about 2 hours. The reaction mixture was cooled to about room temperature and the pH of the mixture was raised to 11 by the addition of 50% sodium hydroxide. n-Hexane was added as a solvent for the reaction product and the aqueous layer was removed. The organic phase was then washed with water until the washings were neutral, dried over anhydrous sodium sulfate and stripped in vacuo yielding 728.1 gms. (95.8% mass yield) of product, primarily N,N-dimethyl $C_{11}$–$C_{15}$ sec-alkylamine having the following analysis:

| | |
|---|---|
| Neutralization equivalent (calculated 231) | 239 |
| Primary amine | Trace |
| Secondary amine _____ percent | 3.34 |
| Tertiary amine _____ do | 96.4 |
| Color (Gardner) | 1 |
| Melting point _____ ° F | −66 |
| Cloud point _____ ° F. below | −36 |
| Specific gravity (25° C.) | 0.799 |

Solubility data

| Solvent: | Solubility[1] |
|---|---|
| Water | Insoluble |
| Acetone | 10 |
| Isopropyl alcohol | 100 |
| Ethyl alcohol | 100 |
| Ethylene glycol | Insoluble |
| Kerosene | 100 |
| Fuel oil | 100 |
| Mineral spirits | 100 |
| Mineral oil | 100 |

[1] Percentage based on a 1:1 ratio by weight of solvent to solute at 77° F.

EXAMPLE II

Under the same conditions as Example I, $C_7$–$C_9$ sec-alkyl primary amine was methylated with formic acid-formaldehyde resulting in the product N,N-dimethyl $C_7$–$C_9$ sec-alkylamine (88% mass yield) having the following properties:

| | |
|---|---|
| Neutralization equivalent (calculated 162) | 171 |
| Primary and secondary amine _____ percent | 2.5 |
| Tertiary amine _____ do | 93.5 |

EXAMPLE III

Under the same conditions as Example I, $C_9$–$C_{11}$ sec-alkyl primary amine was methylated with formic acid-formaldehyde resulting in the product N,N-dimethyl $C_9$–$C_{11}$ sec-alkylamine (88% mass yield) having the following properties:

| | |
|---|---|
| Neutralization equivalent _____ (calculated 180) | 188 |
| Primary and secondary amine | Trace |
| Tertiary amine _____ percent | 95 |

EXAMPLE IV

Under the same conditions as Example I, $C_{15}$–$C_{20}$ sec-alkyl primary amine was methylated with formic acid-formaldehyde resulting in the product N,N-dimethyl $C_{15}$–$C_{20}$ sec-alkylamine (93% mass yield) having the following properties:

| | |
|---|---|
| Neutralization equivalent ____ (calculated 300) | 313 |
| Primary and secondary amine _____ percent | 2 |
| Tertiary amine _____ do | 96 |
| Color (Gardner) | 1 |
| Melting point _____ ° F | 31 |
| Cloud point _____ ° F | 32 |
| Specific gravity (25° C.) | 0.812 |

Solubility data

| Solvent: | Solubility[1] |
|---|---|
| Water | Insoluble |
| Acetone | Insoluble |
| Isopropyl alcohol | 100 |
| Ethyl alcohol | 100 |
| Ethylene glycol | Insoluble |
| Kerosene | 100 |
| Fuel oil | 100 |
| Mineral spirits | 100 |
| Mineral oil | 100 |

[1] Percentage based on a 1:1 ratio by weight of solvent to solute at 77° F.

EXAMPLE V

A 500 ml. glass reactor was charged with 26.8 gms. (0.2 mole) $C_7$–$C_9$ sec-alkylamine. The reactor was then flushed with nitrogen and 8 p.s.i.g. nitrogen pressure was retained after flushing. The amine was then heated to 95° C. and 22.0 gms. (0.5 mole) of ethylene oxide added gradually with stirring over a period of two hours. A sample taken at this time had a neutralization equivalent of 244 and a tertiary amine content of 98.0%. The reaction mixture was then cooled, and 1%, by weight, of sodium hydroxide was added. The temperature was again raised to 95–100° C. and 111.5 gms. ethylene oxide (2.53 moles) was added, in increments, to the reaction mixture over a 7-hour period while the reaction mixture was maintained at 95–100° C. The sodium hydroxide was removed by filtration and the reaction product was obtained as a light-yellow oil, condensation product of 15 moles of ethylene oxide with 1 mole of $C_7$–$C_9$ sec-alkylamine showing the following properties upon analysis:

Neutralization equivalent (calculated for 15.0 moles ethylene oxide 794.5) _____ 802
Tertiary amine _____percent__ 98

EXAMPLE VI

A reactor was charged with 91.5 gms. (0.115 mole) of the condensation product of 15 moles of ethylene oxide with 1 mole of $C_7$–$C_9$ sec-alkylamine, as produced in Example V. The reactor was flushed with nitrogen, heated to about 100° C. and 83.1 gms. (1.89 moles) of ethylene oxide added incrementally with stirring over a 5-hour period. The product was obtained as a soft, white solid having the following analysis:

Neutralization equivalent (calculated for 32 moles ethylene oxide 1542.5) _____ 1525
Tertiary amine _____percent__ 98.5
Glycol _____do____ 11.9

EXAMPLE VII

A one liter Magnedash autoclave was charged with 380.5 gms. (1.875 moles) of $C_{11}$–$C_{15}$ sec-alkylamine. The temperature was raised to 145° C. and 174.6 gms. (3.97 moles) ethylene oxide were added slowly over a period of 2 hours while maintaining the temperature at 145–155° C. The reaction mixture was cooled and N,N-bis(2-hydroxyethyl) $C_{11}$–$C_{15}$ sec-alkylamine was recovered as an amber oil in a 97.5% mass yield of product having the following properties upon analysis:

Neutralization equivalent (calculated for 2 moles of ethylene oxide 291) _____ 289
Primary amine _____ nil
Secondary amine _____percent__ 1.36
Tertiary amine _____do____ 99.1
Color (Gardner) _____ 9
Melting point _____° F. [1] below__ −90
Cloud point _____° F. below__ −36
Specific gravity (25° C.) _____ 0.9095

[1] Samples do not crystallize at this temperature but they do become extremely viscous.

Solubility data
Solvent: Solubility [1]
  Water _____ Insoluble
  Acetone _____ 100
  Isopropyl alcohol _____ 100
  Ethyl alcohol _____ 100
  Ethylene glycol _____ 35
  Kerosene _____ 100
  Fuel oil _____ 100
  Mineral spirits _____ 100
  Mineral oil _____ 100

[1] Percentage based on a 1:1 ratio by weight of solvent to solute at 77° F.

EXAMPLE VIII $C_{11}$–$C_{15}$ sec-alkylamine was ethoxylated with 5 moles of ethylene oxide under the same conditions as Example VII except that the ethylene oxide was added over a 17-hour period. The condensation product of 5 moles of ethylene oxide with 1 mole of $C_{11}$–$C_{15}$ sec-alkylamine exhibited the following properties upon analysis:

Neutralization equivalent (calculated on the basis of 5 moles ethylene oxide 423) _____ 422
Primary amine _____ nil
Secondary amine _____ nil
Tertiary amine _____percent__ 100
Glycol _____do____ 0.82
Color (Gardner) _____ 18
Melting point [1] _____° F. below__ −90
Cloud point _____° F. below__ −36
Specific gravity (25° C.) _____ 0.957

[1] Samples do not crystallize at this temperature but they do become extremely viscous.

Solubility data
Solvent: Solubility [1]
  Water _____ 5
  Acetone _____ 100
  Isopropyl alcohol _____ 100
  Ethyl alcohol _____ 100
  Ethylene glycol _____ 70
  Kerosene _____ 100
  Fuel oil _____ 100
  Mineral spirits _____ 100
  Mineral oil _____ 100

[1] Percentage based on a 1:1 ratio by weight of solvent to solute at 77° F.

EXAMPLE IX

Under the same conditions as Example VIII, $C_{11}$–$C_{15}$ sec-alkylamine was ethoxylated to yield the condensation product of 15 moles of ethylene oxide with 1 mole of $C_{11}$–$C_{15}$ sec-alkylamine having the following analysis:

Neutralization equivalent (calculated on the basis of 15 moles ethylene oxide 863) _____ 858
Primary amine _____ nil
Secondary amine _____ nil
Tertiary amine _____percent__ 100
Glycol _____do____ 1.37
Color (Gardner) _____ 7
Melting point _____° F__ 60
Cloud point _____° F__ 56
Specific gravity (25° C.) _____ 1.042

Solubility data
Solvent: Solubility [1]
  Water _____ 100
  Acetone _____ 100
  Isopropyl alcohol _____ 100
  Ethyl alcohol _____ 100
  Ethylene glycol _____ 100
  Kerosene _____ Insoluble
  Fuel oil _____ Insoluble
  Mineral spirits _____ Insoluble
  Mineral oil _____ Insoluble

[1] Percentage based on a 1:1 ratio by weight of solvent to solute at 77° F.

EXAMPLE X

A 500 ml. glass reactor was charged with 150 gms. (0.58 mole) $C_{15}$–$C_{20}$ sec-alkylamine. The reactor was purged to remove oxygen and then heated to 140° C. and 51 gms. (1.16 moles) of ethylene oxide was added slowly over an 8-hour period. The N,N-bis(2-hydroxyethyl) $C_{15}$–$C_{20}$ sec-alkylamine showed the following properties upon analysis:

| | | |
|---|---|---|
| Neutralization equivalent (calculated for 2 moles ethylene oxide 385) | | 382 |
| Primary amine | | nil |
| Secondary amine | | nil |
| Tertiary amine | percent | 99.0 |
| Glycol | do | 1.39 |
| Color (Gardner) | | 5 |
| Melting point | ° F | 50 |
| Cloud point | ° F | 52 |
| Specific gravity (25° C.) | | 0.897 |

Solubility data

| Solvent: | Solubility[1] |
|---|---|
| Water | Insoluble |
| Acetone | 100 |
| Isopropyl alcohol | 100 |
| Ethyl alcohol | 100 |
| Ethylene glycol | Insoluble |
| Kerosene | 100 |
| Fuel oil | 100 |
| Mineral spirits | 100 |
| Mineral oil | 100 |

[1] Percentage based on a 1:1 ratio by weight of solvent to solute at 77° F.

EXAMPLE XI

A reactor was charged with 84.0 gms. (0.22 mole) of N,N-bis(2-hydroxyethyl) $C_{15}$–$C_{20}$ sec-alkylamine, the product of Example X, and 0.4 gms. of solid sodium hydroxide was added as a catalyst. The reaction mixture was heated to 140° C. and 29.1 gms. (0.66 mole) of ethylene oxide was added over a 3-hour period. The condensation product of 5 moles of ethylene oxide with 1 mole $C_{15}$–$C_{20}$ sec-alkylamine was cooled and upon analysis showed the following properties:

| | | |
|---|---|---|
| Neutralization equivalent (calculated on the basis of 5 moles ethylene oxide 517) | | 549 |
| Primary amine | | nil |
| Secondary amine | | nil |
| Tertiary amine | percent | 94.5 |
| Glycol | do | 0.893 |
| Color (Gardner) | | 8 |
| Melting point | ° F | 39 |
| Cloud point | ° F | 42 |
| Specific gravity (25° C.) | | 0.944 |

Solubility data

| Solvent: | Solubility[1] |
|---|---|
| Water | below 2 |
| Acetone | 100 |
| Isopropyl alcohol | 100 |
| Ethyl alcohol | 100 |
| Ethylene glycol | Insoluble |
| Kerosene | 100 |
| Fuel oil | 100 |
| Mineral spirits | 100 |
| Mineral oil | 100 |

[1] Percentage based on a 1:1 ratio by weight of solvent to solute at 77° F.

EXAMPLE XII

A reactor was charged with 50 gms. (0.193 mole) $C_{15}$–$C_{20}$ sec-alkylamine. The reactor was purged to remove oxygen and then heated to 150° C. and 127.5 gms. (2.9 moles) ethylene oxide was added slowly over a period of about 12 hours. The condensation product of 15 moles ethylene oxide with 1 mole $C_{15}$–$C_{20}$ sec-alkylamine showed the following properties upon analysis:

| | | |
|---|---|---|
| Neutralization equivalent (calculated for 15 moles ethylene oxide 957) | | 966 |
| Primary amine | | nil |
| Secondary amine | | nil |
| Tertiary amine | percent | 99 |
| Glycol | do | 6.74 |
| Color (Gardner) | | 10–11 |
| Melting point | ° F | 82 |
| Cloud point | ° F | 76 |
| Specific gravity (25° C.) | | 1.042 |

Solubility data

| Solvent: | Solubility[1] |
|---|---|
| Water | 50 |
| Acetone | 100 |
| Isopropyl alcohol | 100 |
| Ethyl alcohol | 100 |
| Ethylene glycol | 100 |
| Kerosene | Insoluble |
| Fuel oil | Insoluble |
| Mineral spirits | Insoluble |
| Mineral oil | Insoluble |

[1] Percentage based on a 1:1 ratio by weight of solvent to solute at 77° F.

EXAMPLE XIII

A reactor was charged with 39.6 gms. (0.2 mole) N-($\alpha$-aminopropyl)$C_7$–$C_9$ sec-alkylamine. The reactor was flushed with nitrogen and then heated to 120° C. Ethylene oxide 352.0 gms. (8.0 moles) was added, incrementally with stirring over a 32-hour period while maintaining the reactor at 120–125° C. The condensation product of 40 moles ethylene oxide with 1 mole N-($\alpha$-aminopropyl) $C_7$–$C_9$ sec-alkylamine was obtained as a soft, off-white solid having the following analysis:

| | | |
|---|---|---|
| Neutralization equivalent (calculated for 40 moles ethylene oxide 979) | | 981 |
| Tertiary amine | percent | 99.1 |
| Glycol | do | 3.2 |

EXAMPLE XIV

A reactor was charged with 100 gms. (0.347 mole) N-($\alpha$-aminopropyl)$C_{11}$–$C_{15}$ sec-alkylamine. The reactor was purged to remove oxygen and then heated to 150° C. 53.5 gms. (1.22 moles) ethylene oxide was added slowly over a 7-hour period while the reactor was maintained at 130–150° C. The condensation product of 3 moles of ethylene oxide with 1 mole N-($\alpha$-aminopropyl)$C_{11}$–$C_{15}$ sec-alkylamine showed the following properties upon analysis:

| | | |
|---|---|---|
| Neutralization equivalent (calculated for 3 moles ethylene oxide 420) | | 442 |
| Primary amine | | nil |
| Secondary amine | percent | 1.5 |
| Tertiary amine | do | 98.5 |
| Glycol | do | 1.75 |
| Color (Gardner) | | 18 |
| Melting point | ° F | [1] 0 |
| Cloud point | ° F. below | −36 |
| Specific gravity (25° C.) | | 0.965 |

[1] Material becomes extremely viscous without solidification.

Solubility data

| Solvent: | Solubility[1] |
|---|---|
| Water | below 5 |
| Acetone | 100 |
| Isopropyl alcohol | 100 |
| Ethyl alcohol | 100 |
| Ethylene glycol | 100 |
| Kerosene | 100 |
| Fuel oil | 100 |
| Mineral spirits | 100 |
| Mineral oil | Insoluble |

[1] Percentage based on a 1:1 ratio by weight of solvent to solute at 77° F.

EXAMPLE XV

Similar to Example XIV, N-($\alpha$-aminopropyl)$C_{11}$–$C_{15}$ sec-alkylamine was reacted with 11 moles ethylene oxide at 120–140° C. for a period of 8 hours. The resulting condensation product of 11 moles of ethylene oxide with 1 mole N-(α-aminopropyl)$C_{11}$–$C_{15}$ sec-alkylamine showed the following properties upon analysis:

| | |
|---|---|
| Neutralization equivalent (calculated for 11 moles of ethylene oxide 386) | 395 |
| Primary amine | Trace |
| Secondary amine _____percent__ | 3 |
| Tertiary amine _____do____ | 94.2 |
| Glycol _____do____ | 6.6 |
| Color (Gardner) _____above__ | 18 |
| Melting point _____° F__ | [1] —6 |
| Cloud point _____° F. below__ | —36 |
| Specific gravity (25° C.) | 1.018 |

[1] Material becomes extremely viscous without solidification.

Solubility data

| Solvent: | Solubility [1] |
|---|---|
| Water | 100 |
| Acetone | 100 |
| Isopropyl alcohol | 100 |
| Ethyl alcohol | 100 |
| Ethylene glycol | below__ 5 |
| Kerosene | Insoluble |
| Fuel oil | Insoluble |
| Mineral spirits | Insoluble |
| Mineral oil | Insoluble |

[1] Percentage based on a 1:1 ratio by weight of solvent to solute at 77° F.

EXAMPLE XVI

In a manner similar to Example XIV, 531.5 gms. (1.45 moles) N-(α-aminopropyl)$C_{15}$–$C_{20}$ sec-alkylamine was reacted with 287 gms. (6.53 moles) ethylene oxide over a 12-hour period. The condensation product of 4.5 moles ethylene oxide with 1 mole N-(α-aminopropyl)$C_{15}$–$C_{20}$ sec-alkylamine showed the following properties upon analysis:

| | |
|---|---|
| Neutralization equivalent (calculated for 4.5 moles ethylene oxide 281) | 287 |
| Primary amine | nil |
| Secondary amine _____percent__ | 3.55 |
| Tertiary amine _____do____ | 96.5 |
| Glycol _____do____ | 9.61 |
| Color (Gardner) | 15 |
| Melting point _____° F__ | 41 |
| Cloud point _____° F__ | 46 |
| Specific gravity (25° C.) | 0.944 |

Solubility data

| Solvent: | Solubility [1] |
|---|---|
| Water | Below 2 |
| Acetone | 100 |
| Isopropyl alcohol | 100 |
| Ethyl alcohol | 100 |
| Ethylene glycol | 100 |
| Kerosene | 100 |
| Fuel oil | 100 |
| Mineral spirits | 100 |
| Mineral oil | 100 |

[1] Percentage based on a 1:1 ratio by weight of solvent to solute at 77° F.

EXAMPLE XVII 75.0 gms. (0.13 mole) of the product obtained in Example XVI was added to a reactor with 0.8 gms. of solid sodium hydroxide as a catalyst. The reaction mixture was heated to 150° C. and 46.0 gms. (1.04 moles) ethylene oxide was added over a 10-hour period. The condensation product of 12.5 moles ethylene oxide with 1 mole N-(α-aminopropyl)$C_{15}$–$C_{20}$ sec-alkylamine showed the following properties upon analysis:

| | |
|---|---|
| Neutralization equivalent (calculated for 12.5 moles ethylene oxide 463) | 473 |
| Primary amine | Nil |
| Secondary amine _____percent__ | 3 |
| Tertiary amine _____do____ | 94.7 |
| Glycol _____do____ | 1.95 |
| Color (Gardner) | 8 |
| Melting point _____° F__ | 46 |
| Cloud point _____° F__ | 46 |
| Specific gravity (25° C.) | 1.023 |

Solubility data

| Solvent: | Solubility [1] |
|---|---|
| Water | 100 |
| Acetone | 100 |
| Isopropyl alcohol | 100 |
| Ethyl alcohol | 100 |
| Ethylene glycol | 100 |
| Kerosene | Insoluble |
| Fuel oil | Insoluble |
| Mineral spirits | Insoluble |
| Mineral oil | Insoluble |

[1] Percentage based on a 1:1 ratio by weight of solvent to solute at 77° F.

EXAMPLE XVIII

A 300 ml. stainless steel autoclave was charged with 28.8 gms. (0.1 mole) of N-(α-aminopropyl)$C_{11}$–$C_{15}$ sec-alkylamine and then flushed with nitrogen. The temperature was raised to 120–125° C. and 34.4 gms. (0.59 mole) propylene oxide was added incrementally and with stirring, over a five and one-half hour period. After the initial induction period when the propylene oxide began to react, as indicated by a drop in pressure, the reaction temperature was raised to 150° C. The condensation product of 6 moles propylene oxide with 1 mole N-(α-aminopropyl) $C_{11}$–$C_{15}$ sec-alkylamine was obtained as a dark, viscous oil which showed the following properties upon analysis:

| | |
|---|---|
| Neutralization equivalent (calculated for 6 moles propylene oxide 276) | 283 |
| Tertiary amine _____percent__ | 99.4 |
| Glycol _____do____ | 2.7 |

EXAMPLE XIX

A reactor was charged with 28.6 gms. (0.1 mole) 1-amino sec-octadecylamine derived from oleic acid. The reactor was purged with 8 p.s.i. $N_2$ and then heated to 100° C. Ethylene oxide (88 gms., 2.0 moles) was added incrementally over a 12.5-hour period while maintaining the reactor at 120°–140° C. The reaction proceeded during the last 1½ hours in the presence of NaOH(1 wt. percent of total charge). The product was obtained as a dark oil. The condensation product of 20 moles of ethylene oxide with 1 mole 1-amino sec-octadecylamine showed the following properties upon analysis:

| | |
|---|---|
| Neutralization equivalent (calculated for 20 moles ethylene oxide 583) | 587 |
| Tertiary amine _____percent__ | 99 |
| Glycol _____do____ | 7.85 |

EXAMPLE XX

A one liter Morton flask equipped with a mechanical stirrer, thermometer, addition funnel, and reflux condenser was charged with 50 gms. (0.174 mole) of 1-amino sec-octadecylamine, 25 gms. of isopropanol, and 25 gms. of water. Formic acid (87.5 gms., 2.09 moles, 88% aqueous solution) was then added to the reaction flask over a 3½ hour period, maintaining the temperature at 25–30° C. The temperature was raised to 65–70° C. and 38.0 gms. (1.39 moles) of 37% formaldehyde was added over a period of one hour. The reaction mixture was maintained at reflux temperature (85° C.) for about 17 hours. The product was separated as in Example I to yield 53.0 gms. (91.3% mass yield) of N,N,N′,N′-tetramethyl 1-amino sec-octadecylamine having the following analysis:

| | |
|---|---|
| Neutralization equivalent (calc. 170) | 201 |
| Primary amine _____percent__ | 4.2 |
| Secondary amine _____do____ | 7.1 |
| Tertiary amine _____do____ | 68.0 |

Other amino compounds are suitable reactants for preparing N-secondary-alkyl tertiary amine compounds of this invention. Illustrative amino compounds include those derived from cyclic olefins such as cyclohexene, cyclooctene, etc.; polyunsaturated olefins such as 1,7-octadiene; and unsaturated acids such as 10-undecenoic acid, oleic acid, erucic acid, and ricinoleic acid.

The N-secondary-alkyl tertiary amines of this invention have surprisingly low melting points when compared to presently available tertiary amines having the nitrogen at a terminal position with respect to the long chain alkyl group. The following table is illustrative.

Table I

| Amine: | Melting point °F. |
|---|---|
| Cocodimethyl tertiary amine | −4 |
| Dodecyldimethyl tertiary amine | 0 |
| N,N-dimethyl $C_{11}$–$C_{15}$ sec-alkylamine | −66 |
| Hydrogenated tallow dimethyl tertiary amine | 67 |
| N,N-dimethyl $C_{15}$–$C_{20}$ sec-alkylamine | 31 |

The lower melting points render the tertiary amines of this invention particularly useful as additive chemicals to utilize their cationic surface-active properties at extreme temperature conditions.

While in the foregoing specification, this invention has been described in relation to specific embodiments and many details have been set forth for purposes of illustration, it will be apparent to those skilled in the art that the invention is susceptible to additional embodiments than those specifically disclosed herein, and that certain of the details set forth can be varied without departing from the basic principles and spirit of the invention.

We claim:

1. N-secondary-alkyl tertiary amine compounds represented by the formula

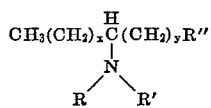

wherein R is selected from the group consisting of —$(CH_2CH_2O)_m$ H, and

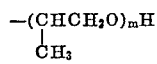

wherein $m$ is an integer and the sum of the values of $m$ for the entire molecule is from 2 to about 80; R′ is selected from the group consisting of R and

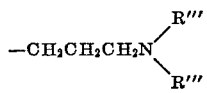

wherein R‴ is selected from the group consisting of —$CH_3$ and R as defined above; R″ is selected from the group consisting of —H and

wherein R‴ and R′ are the same as defined above; and $x$ and $y$ are positive integers having a sum from 2 to about 47.

2. N-secondary-alkyl tertiary amine compounds represented by the formula

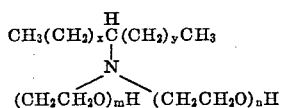

wherein $x$ and $y$ are integers having a sum from 1 to about 20, and $m$ and $n$ are integers having a sum from 2 to about 50.

3. The compound of claim 2 wherein the sum of $x$ and $y$ is 4.

4. The compound of claim 2 wherein the sum of $x$ and $y$ is 8.

5. The compound of claim 2 wherein the sum of $x$ and $y$ is 14.

6. The compound of claim 2 wherein the sum of $x$ and $y$ is 17.

7. N-secondary-alkyl tertiary amine compounds represented by the formula

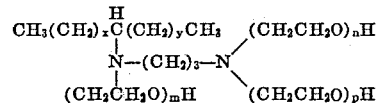

wherein $x$ and $y$ are integers having a sum from 1 to about 20, and $m$, $n$ and $p$ are integers having a sum from 2 to about 50.

8. The compound of claim 7 wherein the sum of $x$ and $y$ is 12.

9. N-secondary-alkyl tertiary amine compounds represented by the formula

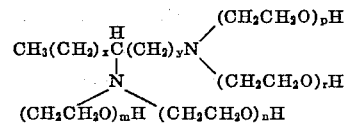

wherein $x$ and $y$ are positive integers having a sum from 2 to about 20, and $m$, $n$, $p$ and $r$ are integers having a sum from 2 to about 50.

10. N-secondary-alkyl tertiary amine compounds represented by the formula

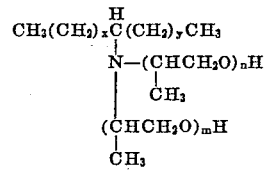

wherein $x$ and $y$ are integers having a sum from 1 to about 20, and $m$ and $n$ are integers having a sum from 2 to about 50.

11. N-secondary-alkyl tertiary amine compounds represented by the formula

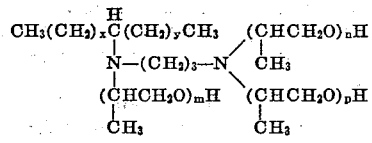

wherein $x$ and $y$ are integers having a sum from 1 to about 20, and $m$, $n$ and $p$ are integers having a sum from 2 to about 50.

12. N-secondary-alkyl tertiary amine compounds represented by the formula

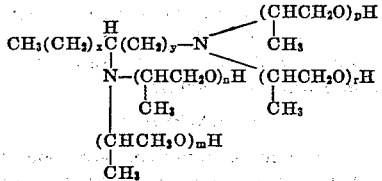

wherein $x$ and $y$ are positive integers having a sum from 2 to about 20, and $m$, $n$, $p$ and $r$ are integers having a sum from 2 to about 50.

(References on following page)

References Cited

UNITED STATES PATENTS

| | | | |
|---|---|---|---|
| 2,230,752 | 2/1941 | Klavehn et al. | 260—583 |
| 2,930,761 | 3/1960 | Charret | 260—584 |
| 3,029,208 | 4/1962 | Khawam | 260—584 |
| 3,083,143 | 3/1963 | Schmid et al. | 260—584 |
| 3,270,060 | 8/1966 | Wakeman et al. | 260—583 |

FOREIGN PATENTS

| | | |
|---|---|---|
| 780,028 | 4/1935 | France. |

OTHER REFERENCES

Mannich et al., Berichte, vol. 68, pp. 273 to 276 (1935).

Lukes et al., Collection Des Travaux Chimiques De Tchecoslovoguie, vol. 19, pp. 930 to 933, 939 and 940 (1954).

Icke et al., Organic Synthesis, Collective vol. III, pp. 723 and 724 (1955).

Cope et al., Journal of the American Chemical Society, vol. 79, pp. 4720 and 4727 (1957).

CHARLES B. PARKER, *Primary Examiner.*

R. L. RAYMOND, *Assistant Examiner.*